United States Patent [19]

Bederke et al.

[11] Patent Number: 5,136,004
[45] Date of Patent: Aug. 4, 1992

[54] BINDER, PROCESS FOR ITS PREPARATION AND ITS USE IN CLEAR OR PIGMENTED COATING AGENTS

[75] Inventors: Klaus Bederke, Sprockhövel; Hermann Kerber, Wuppertal; Manfred Krumme, Erfstadt; Fritz Sadowski, Brauweiler bei Köln; Werner Stephan, Wuppertal, all of Fed. Rep. of Germany

[73] Assignee: Herberts Gesellschaft mit beschrankter Haftung, Wuppertal, Fed. Rep. of Germany

[21] Appl. No.: 391,541

[22] PCT Filed: Dec. 2, 1988

[86] PCT No.: PCT/EP88/01097
§ 371 Date: Nov. 13, 1990
§ 102(e) Date: Nov. 13, 1990

[87] PCT Pub. No.: WO89/05314
PCT Pub. Date: Jun. 15, 1989

[30] Foreign Application Priority Data

Dec. 2, 1987 [DE] Fed. Rep. of Germany ....... 3740774

[51] Int. Cl.⁵ ................. C08F 212/08; C08F 220/32; C09D 3/80

[52] U.S. Cl. ................. 526/273; 526/318.42
[58] Field of Search ............. 526/273, 318.42

[56] References Cited

FOREIGN PATENT DOCUMENTS 2759234 7/1979 Fed. Rep. of Germany ...... 526/273

Primary Examiner—Paul R. Michl
Assistant Examiner—Peter Szekely
Attorney, Agent, or Firm—Schweitzer Cornman & Gross

[57] ABSTRACT

The invention concerns a binder suitable for clear or pigmented coating agents. Binders based on copolymers containing hydroxyl groups have hitherto a high solvent content. The solids content of the new binders is improved without affecting the viscosity; gloss, body, flow and processing properties of coatings containing the new binders are improved. The binders consist essentially of a copolymer containing hydroxyl groups, made from specific quantities of styrol, tertbutacrylate, isobutyl methacrylate, 2-ethylhexyl methacrylate, 2-hydroxypropyl methacrylate, butanediol-1, 4-monoacrylate, acrylic acid and glycidyl esters of α-alkylalkane monocarboxylic acids and/or α,α-dialkylalkane monocarboxylic acids.

3 Claims, No Drawings

BINDER, PROCESS FOR ITS PREPARATION AND ITS USE IN CLEAR OR PIGMENTED COATING AGENTS

The invention relates to binders containing copolymers containing hydroxyl groups and based on addition products of α, β-unsaturated acids and glycidyl esters, and also, α, β-unsaturated monomers with and without hydroxyl groups which can form mixed polymers. It also relates to the preparation of hydroxyl-group containing copolymers of this type and their use in clear and pigmented coating agents.

Copolymers containing hydroxyl groups and based on (meth)acrylates and reaction products of acrylic acid and glycidyl esters of α-alkylalkanemonocarboxylic acids and/or α, α-dialkylalkane-monocarboxylic acids which can be processed with organic polyisocyanates to produce coating agents are known. German Auslegeschrift 16 68 510 describes copolymers of addition products of α,β-ethylenically unsaturated acids and glycidyl esters and also, α,β-unsaturated monomers with and without hydroxyl groups which can form mixed polymers. German Patentschrift 26 03 259 discloses cold-hardening paints which contain special binders of the type described generally in German Auslegeschrift 16 68 510. They are mixed polymers based on styrene, methylmethacrylate, hydroxyethylmethacrylate, acrylic acid and glycidyl esters of α-alkylalkanemonocarboxylic acids and/or α,α-dialkylalkanemonocarboxylic acids which are obtained by heating in inert solvents in the presence of polymerisation initiators, optionally using chain terminators with simultaneous esterification and polymerisation. These known coating agents do produce films which are resistant to solvents, water and weathering. However, films of this type do not have sufficient surface hardness whether they are dried at room temperature or lower temperatures. This negative property is particularly noticeable when used for repair paint coatings of vehicle bodies in the winter months. Even for force (30 minutes, 60° C.) dried paint films, the assembly strength is only achieved after 4 hours. Furthermore, edge alignment occurs when paint coating vehicle bodies at sharp edges. The body of cold-hardening paints of this type is not adequate in grooves and beads.

The object of the invention is therefore the preparation of binders or clear or pigmented coating agents which give coatings having high gloss, good body, good flow and improved processing safety.

It has been shown that this object is achieved by preparing a binder which contains a copolymer containing hydroxyl groups based on addition products of α,β-unsaturated acids and glycidyl esters and also α,β-unsaturated monomers with and without hydroxyl groups which can form mixed copolymers, and which is characterised in that it consists essentially of a copolymer containing hydroxyl groups and which can be obtained from a) 24.5 to 30.0 wt. % of styrene,
b) 12.0 to 15.0 wt. % of tert.-butylacrylate,
c) 4.0 to 7.0 wt. % of iso-butylmethacrylate,
d) 6.0 to 9.0 wt. % of 2-ethylhexylmethacrylate,
e) 14.0 to 17.0 wt. % of 2-hydroxypropylmethacrylate,
f) 10.0 to 13.0 wt. % of butanediol-1,4-monoacrylate,
g) 4.0 to 5.0 wt. % of acrylic acid,
h) 13.0 to 15.5 wt. % of glycidyl ester of α-alkylalkanemonocarboxylic acids and/or α,α-dialkylalkanemonocarboxylic acids, wherein the sum of the numerical values of components a) to h) totals 100% in each case.

It has been shown that a binder of this type has an increased solids content at comparable viscosity or a lower viscosity at the same solids content, compared to the state of the art as shown in German Auslegeschrift 16 68 510 and in particular in German Patentschrift 26 03 259, when used with divalent and/or multivalent polyisocyanates. Furthermore, it has advantages for paint applications, such as improved gloss, body, flow, processing safety at high solid content.

The preparation of the copolymer of the invention can be carried out by polymerisation according to conventional processes, for example solid-state or solution polymerisation. These polymerisation processes are well known and described in: Houben-Weyl, Methoden der Organischen Chemie (Methods in Organic Chemistry), 4th edition, volume 14/1, pages 24–255 (1961).

The solution polymerisation process is preferred for the preparation of the copolymer of the invention. In this process, the solvents and the glycidyl esters of α-alkylalkanemonocarboxylic acids and/or α,α-dialkylalkanemonocarboxylic acids are placed in the reaction vessel, heated to boiling temperature and the mixture of monomer and initiator is added continuously within a certain time.

The polymerisation is carried out at temperatures between 100° C. and 160° C., preferably at 130° C. to 150° C.

The polymerisation reaction is started with known polymerisation initiators. Suitable initiators are, for example peroxides which decompose thermally into radicals in a reaction of the 1st order. The type and amount of initiator are chosen so that as constant as possible a radical supply is present during the addition phase at the polymerisation temperature.

Initiators which are preferably used for polymerisation are: dialkylperoxides, such as di-tert.-butylperoxide, dicumylperoxide; hydroperoxides, such as cumene hydroperoxide, tert.-butylhydroperoxide; peresters, such as tert.-butylperbenzoate, tert.-butyl-perpivalate, tert.-butyl-per-3,5,5-trimethylhexanoate, tert.-butyl-per-2-ethylhexanoate.

The polymerisation initiators, in particular di-tert.-butylperoxide and tert.-butylperbenzoate, are preferably added in an amount of 0.1 to 2 wt. %, relative to the quantity of weighted monomer.

Chain transfer agents may be co-used to control the molecular weight. Examples are mercaptans, thioglycolates, chlorinated hydrocarbons.

The polymerisation conditions (reaction temperature, addition time of the monomer mixture, solution concentration) are adjusted so that the copolymers prepared according to the invention have an average molecular weight (determined by gel permeation chromatography using polystyrene as calibrating substance) between 2,000 and 20,000.

Solvents which can be used are conventional inert solvents for solution polymerisation. Preferred suitable organic solvents are those which are then also used later in the finished coating agents. Examples of such solvents are: glycol ethers, such as ethylene glycol dimethylether; glycol ether esters, such as ethyl glycol acetate, butyl glycol acetate, 3-methoxy-n-butylacetate, butyl diglycol acetate, methoxypropyl acetate; esters, such as butyl acetate, isobutyl acetate, amyl acetate; and ketones, such as methyl ethyl ketone, methyl isobutyl ketone, diisobutyl ketone, cyclohexanone, isophorone. Aromatic hydrocarbons, such as xylene, Solvesso 100 (registered trademark for aromatic hydrocarbon mixtures), and aliphatic hydrocarbons can also be used blended with the above-mentioned solvents.

Glycidyl esters of α-alkylalkanemonocarboxylic acids and/or α, α-dialkylalkanemonocarboxylic acids are used as component h) for the preparation of the copolymers containing hydroxyl groups used in accordance with the invention. Preferred glycidyl esters are those having the empirical formula $C_{13}H_{24}O_3$ individually or as a mixture. As the empirical formula $C_3H_5O$ is given to the glycidyl radical in the glycidyl ester of such α-alkylalkanemonocarboxylic acids and/or α,α-dialkylalkanemonocarboxylic acids, the α-alkylalkanemonocarboxylic acids and α, α-dialkylalkanemonocarboxylic acids are isomer mixtures of those monocarboxylic acids which contain a $C_{10}$ chain. The acids are thus preferably completely saturated and very heavily substituted at the carbon atom in the α position; examples of this are described in "Deutsche Farbenzeitschrift" (German Colour Journal), Volume 10/16th year, page 435.

The binders according to the invention can be processed to give clear or pigmented coating agents. For this purpose conventional paint additives and auxiliaries are optionally added and a conventional paint polyisocyanate is added to the coating agents in solvents. Thus 20 to 40 wt. % of divalent or multivalent polyisocyanate B) are preferably added to 60.0 to 80.0 wt. % of the copolymer A) containing hydroxyl groups; the sum of components A) and B) is 100% in each case.

The polyisocyanates B) which may be used to crosslink the copolymer A) of the invention are typical paint polyisocyanates.

The proportion of polyisocyanate crosslinking agents is chosen so that 0.5 to 1.5 isocyanate groups are used for every hydroxyl group of the binder mixture. Excess isocyanate groups may react as a result of moisture and contribute to the crosslinking.

Aliphatic, cycloaliphatic and aromatic polyisocyanates may be used, such as hexamethylene diisocyanate, trimethylhexamethylene diisocyanate, isophorone diisocyanate, 4,4'-diisocyanatodicyclohexylmethane, toluylene-2,4-diisocyanate, o-xylylene diisocyanate, m-xylylene diisocyanate and p-xylylene diisocyanate, 4,4'-diisocyanatodiphenylmethane; masked polyisocyanates, such as polyisocyanates masked with CH, NH or OH acid bonds; and for example polyisocyanates containing biuret, allophanate, urethane or isocyanurate groups. Examples of polyisocyanates of this type are a reaction product containing biuret groups from 3 moles of hexamethylene diisocyanate and 1 mole of water having an NCO content of approximately 22% (corresponding to the commercial product Desmodur N BAYER AG, registered trademark); a polyisocyanate containing isocyanurate groups prepared by trimerising 3 moles of hexamethylene diisocyanate and having an NCO content of about 21.5% (corresponding to the commercial product Desmodur N 3390 BAYER AG, registered trademark) or polyisocyanates containing urethane groups which are reaction products of 3 moles of toluylene diisocyanate and 1 mole of trimethylolpropane having an NCO content of about 17.5% (corresponding to the commercial product Desmodur L BAYER AG, registered trademark).

Desmodur N and Desmodur N 3390, BAYER AG, registered trademarks are preferably used.

As mentioned above, transparent or pigmented coating agents are prepared from components A) and B). Transparent coating agents are used, for example as clear paints in 2-layer paint coating comprising a base layer containing a pigment and a transparent covering layer applied using the wet-on-wet process, and then cured either in air or in stoving ovens. In addition to conventional solvents to adjust the spraying viscosity, these clear paints optionally contain conventional flow agents and light stabilisers, as well as other conventional paint additives.

To prepare pigmented coating agents, the individual components are mixed with one another and homogenised in the conventional manner or comminuted. An example of the procedure is to initially mix one part of copolymer (A) with optionally present pigments and paint auxiliaries and solvents and to grind the mixture in grinding apparatus.

The ground product is then added to the remaining copolymer solution.

The coating agents obtained from the binder of the invention, which is a copolymer containing hydroxyl groups, have the great advantage of a high solids content at relatively low viscosity. Their flow properties are excellent and they give coatings of excellent gloss and outstanding body. The coatings obtained are ready for assembly very quickly and adhesive tape may be applied shortly after coating, for example in order to carry out multi-layer paint coating. The coating agents which may be obtained from the binders of the invention are thus particularly suitable in the vehicle industry for paint coating vehicle bodies, but are also suitable in the repair business for quick repair of, for example accident damage.

The following examples are used to explain the invention.

The preparation and comparative tests I were carried out with reference to German Offenlegungsschrift 26 03 259.

The preparation and comparative tests II were carried out with reference to German Offenlegungsschrift 28 51 613.

PREPARATION AND COMPARATIVE TESTS I

Preparation of the Binder (Component A)

Component I in an amount corresponding to the details in the following table is placed in a 4 liter three-necked ground joint flask fitted with a stirrer, contact thermometer, ball condenser and dropping funnel, and heated at 144° C. with stirring and the reflux condenser switched on.

Component II (monomer mixture and initiator) is added continuously from the dropping funnel in the course of 6 hours. The temperature falls towards the end of the addition time to 139° C. When addition is complete, the dropping funnel is rinsed with component III and this is added to the reaction mixture.

Polymerisation then contines for 5 hours at 139° to 140° C. so that the reaction proceeds to 99%.

The polymer is then cooled to 60° C. and diluted with component IV.

For comparison purposes, a further binder is prepared in the same manner in accordance with German Patentschrift 26 03 259; the components can also be seen in the following table.

The properties of the binder obtained in accordance with the present invention (component A) and also that obtained in accordance with German Patentschrift 26 03 259 are also listed in the following table. It can be seen that for comparable solids contents a considerably lower viscosity is achieved in accordance with the invention than with the state of the art. The binders of the invention are therefore particularly suitable for so-called high solid coating agents.

TABLE (Weighed quantities in grams)

| | Component: | Component A) | Comparison in accordance with German Patentschrift 2603259 |
|---|---|---|---|
| I | Butyl acetate | 110 | 110 |
| | Xylene | 290 | 290 |
| | Mixture of aromatic hydrocarbons (Solvesso 100, registered trademark) | 186 | 186 |
| | Glycidyl ester (Cardura E 10, registered trademark) | 160 | 281 |
| II | Styrene | 294 | 294 |
| | Methylmethacrylate | — | 219 |
| | tert.-Butylacrylate | 144 | — |
| | iso-Butylmethacrylate | 62 | — |
| | 2-Ethylhexylmethacrylate | 80 | — |
| | Butanediol-1,4-monoacrylate | 124 | — |
| | 2-Hydroxypropyl-methacrylate | 170 | — |
| | Hydroxyethylmethacrylate | — | 204 |
| | Acrylic acid | 48 | 84 |
| | Di-tert.-butylperoxide | 18 | 18 |
| III | Xylene | 60 | 60 |
| IV | Butyl acetate | 214 | 214 |
| | Xylene | 40 | 40 |
| | Total | 2,000 | 2,000 |
| Properties: | | | |
| Solids (%): | | 54.9 | 54.8 |
| Viscosity (mPa.s at 25° C.): | | 452 | 1387 |
| Acid number (relative to solid resin): | | 9.9 | 6.1 |
| OH number (relative to solid resin): | | 138 | 138 |

Preparation of a Coating Agent Using Component A 1,000 parts by weight of n-butyl acetate, 1,000 parts by weight of a 10% strength silicon oil solution in xylene, 5,000 parts by weight of a mixture of aromatic hydrocarbons (SOLVESSO 100, registered trademark), 2,607 parts by weight of xylene-isomer mixture, 0.750 parts by weight of light stabiliser of the benztriazole type, 0.7500 parts by weight of light stabiliser of the H A L S type (sterically hindered amine), 0.320 parts by weight of N,N'-diethylethanolamine and 0.073 parts by weight of a 10% strength dibutyl-tin dilaurate solution in xylene are placed in a clean dry container and thoroughly mixed. 88.500 parts by weight of the copolymer (binder A) containing hydroxyl groups prepared above are then added and the mixture is stirred. A clear paint having a solids content of 50.3% and a run-out time of 80 seconds in a DIN A4 cup is obtained.

A curing agent is prepared by mixing the following components as the second component (component B) of the coating agent:

| | Parts by weight |
|---|---|
| Polyisocyanate based on hexamethylene diisocyanate | 40.00 |
| Butylglycol acetate | 14.00 |
| 3-Methoxy-n-butyl acetate | 8.60 |
| n-Butyl acetate | 26.10 |
| Mixture of aromatic hydrocarbons (SOLVESSO 100, registered trademark) | 6.80 |
| Xylene | 4.50 |
| | 100.00 |

Preparation of a Coating Agent Using the Binder Prepared Above in Accordance with German Patentschrift 26 03 259

A coating agent was prepared from the following components in the same manner as described above:

| | Wt. % |
|---|---|
| Copolymer, 55% strength (comparative example according to German Patentschrift 26 03 259, composition according to Table 1) | 82.500 |
| N-Butyl acetate | 1.300 |
| Silicon oil solution, 10% strength in xylene | 1.000 |
| Mixture of aromatic hydrocarbons (SOLVESSO 100, registered trademark) | 7.927 |
| Xylene | 5.400 |
| Light stabilizer of the benztriazole type | 0.750 |
| Light stabilizer of the H A L S type | 0.750 |
| N,N'-Diethylethanolamine | 0.320 |
| Dibutyl-tin dilaurate solution, 10% strength in xylene | 0.053 |
| | 100.000 |

The curing agent was prepared in the same manner as described above for component B.

Application of the Coating Agents Obtained

The coating agents containing binder A prepared above or binder according to German Patentschrift 26 03 259 were mixed with the above curing agent (component B) in a weight-mixture ratio of 2:1 shortly before processing in each case.

The cold-hardening paints obtained, which both had a run-out time of approximately 22 seconds in a DIN A4 cup, were applied using the wet-on-wet process to a basic paint layer by spray application of a dry film layer thickness of 50 to 60 μm, and after a flash-off time of 10 minutes it was then cured for 30 minutes at 60° C.

A comparison of the two coats obtained showed a clear improvement in gloss and body (building) of the coating agent of the invention as a result of optical assessment. A even layer thickness distribution on edges and beads was obtained using the coating agent of the invention; in particular there was no bulging at the edges; however, bulging of this type was evident for the known coating agent. The flow was clearly improved for the coating agent of the invention. Likewise, the ability of the coating prepared using the coating agent of the invention to have an adhesive strip attached to it to carry out multi-layer paint coating was improved; when removing the adhesive strip no lasting marks remained for the coating agent of the invention. The coating obtained using the coating agent of the invention was ready for assembly after 1.5 hours, the coating obtained using the known coating agent was ready for assembly only after 4 hours. The coating agent of the invention thus proves to be ready for processing more quickly than the state of the art and has clearly improved coating properties.

PREPARATION AND COMPARATIVE TESTS II

The preparation of the binder of the invention component A was carried out as for preparation test I.

COMPARATIVE TEST 1

EXAMPLE 1 German Offenlegungsschrift 28 51 613

A mixture consisting of
522.9 g of xylene
266.8 g of ethylglycol acetate
275.7 g of glycidyl ester of an $\alpha, \alpha'$-dialkylalkanemonocarboxylic acid (epoxy equivalent weight=248)
80.0 g of acrylic acid
5.3 g of polypropyleneglycolmonomethacrylate molecular weight 350-387
17.1 g of hydroxyethylmethacrylate
26.7 g of styrene
26.7 g of methylmethacrylate
13.2 g of dodecylmercaptan
was maintained for 3 hours at 141° C. under reflux in a 4 liter three-necked ground joint flask fitted with a stirrer, reflux condenser and thermometer, until an acid number of 16.4 mg KOH/g, relative to the amount of monomer used, was reached.

Then a mixture consisting of
53.3 g of propyleneglycolmonomethacrylate molecular weight 350-387
177.8 g of hydroxyethylmethacrylate
254.7 g of styrene
254.7 g of methylmethacrylate
13.2 g of di-tert.-butylperoxide
11.9 g of dodecylmercaptan
was added continuously from a dropping funnel in the course of 4 hours. Copolymerisation was then carried out for a further 3 hours by heating under reflux.

A clear yellow-coloured polymer solution having a solids content of 60.7% and an acid number of 7.0 mg KOH/g, relative to solids content, was obtained.

After diluting with xylene to 50% weight per cent, a viscosity of 147 seconds was measured (flow cup having flow nozzle of 4 mm diameter at 20° C.).

COMPARATIVE TEST 2

EXAMPLE 4 German Offenlegungsschrift 28 51 613

A mixture consisting of
525.6 g of xylene
268.1 g of ethylglycol acetate
277.1 g of glycidyl ester of an $\alpha, \alpha'$-dialkylalkanemonocarboxylic acid (epoxy equivalent weight=248)
80.4 g of acrylic acid
44.7 g of styrene
3.0 g of dodecylmercaptan
was maintained for 3 hours at 141° C. under reflux in a 4 liter three-necked ground joint flask fitted with a stirrer, reflux condenser and thermometer, until an acid number of 17.1 mg KOH/g, relative to the amount of monomer used, was reached.

Then a mixture consisting of
254.9 g of hydroxyethylmethacrylate
238.2 g of styrene
282.8 g of methylmethacrylate
12.0 g of di-tert.-butylperoxide
13.2 g of dodecylmercaptan
was added continuously from a dropping funnel in the course of 4 hours. Copolymerisation was then carried out for a further 2.5 hours by heating under reflux.

A clear yellow-coloured polymer solution having a solids content of 60.8% and an acid number of 4.9 mg KOH/g, relative to solids content, was obtained.

After diluting with xylene to 50% weight per cent, a viscosity of 566 seconds was measured (flow cup having flow nozzle of 4 mm diameter at 20° C.).

COMPARATIVE TEST 3

Claim 6 German Offenlegungsschrift 28 51 613

A mixture consisting of
494 g of xylene
266 g of ethylglycol acetate
322 g of glycidyl ester of an $\alpha, \alpha'$-dialkylalkanemonocarboxylic acid (epoxy equivalent weight=248)
101 g of acrylic acid
6 g of butylmethacrylate
12 g of isobutylmethacrylate
12 g of styrene
19 g of butylacrylate
27 g of butanediolmonoacrylate
was maintained for 3 hours at 142° C. under reflux in a 4 liter three-necked ground joint flask fitted with a stirrer, reflux condenser and thermometer.

Then a mixture consisting of
56 g of butylmethacrylate
112 g of isobutylmethacrylate
112 g of styrene
187 g of butylacrylate
260 g of butanediolmonoacrylate
14 g of di-tert.-butylperoxide
was added continuously from a dropping funnel in the course of 4 hours. Copolymerisation was then carried out for a further 3 hours by heating under reflux.

A clear yellow-coloured polymer solution having a solids content of 62.2% and an acid number of 8.2 mg KOH/g, relative to solids content, was obtained.

After diluting with xylene to 50% weight per cent, a viscosity of 118 seconds was measured (flow cup having flow nozzle of 4 mm diameter at 20° C.).

COMPARATIVE TEST 4

Claim 6 German Offenlegungsschrift 28 51 613

A mixture consisting of
494 g of xylene
266 g of ethylglycol acetate
112 g of glycidyl ester of an $\alpha,\alpha'$-dialkylalkanemonocarboxylic acid (epoxy equivalent weight=248)
40 g of acrylic acid
6 g of butylmethacrylate
12 g of isobutylmethacrylate
12 g of styrene
66 g of butylacrylate
5 g of butanediolmonoacrylate
was maintained for 3 hours at 139° C. under reflux in a 4 liter three-necked ground joint flask fitted with a stirrer, reflux condenser and thermometer.

Then a mixture consisting of
56 g of butylmethacrylate
112 g of isobutylmethacrylate
112 g of styrene
649 g of butylacrylate
46 g of butanediolmonoacrylate
12 g of di-tert.-butylperoxide was added continuously from a dropping funnel in the course of 4 hours. Copolymerisation was then carried out for a further 3 hours by heating under reflux.

A clear, almost colourless polymer solution having a solids content of 62.0% and an acid number of 7.4 mg KOH/g, relative to solids content, was obtained.
After diluting with xylene to 50% weight per cent, a viscosity of 21 seconds was measured (flow cup having flow nozzle of 4 mm diameter at 20° C.).

PREPARATION OF THE CLEAR PAINTS USING THE COPOLYMER OF THE INVENTION (COMPONENT A) AND THE BINDER COMPONENTS FROM COMPARATIVE TESTS 1 TO 4

1. Clear Paint Using Copolymer of the Invention (Component A)

1,000 parts by weight of n-butyl acetate, 1,000 parts by weight of a 10% strength silicon oil solution in xylene, 5,000 parts by weight of SOLVESSO 100 ®, 2,607 parts by weight of xylene-isomer mixture, 0.750 parts by weight of light stabiliser of the BENZTRIAZOLE type, 0.7500 parts by weight of light stabiliser of the H A L S type, 0.320 parts by weight of N,N'-diethylethanolamine and 0.073 parts by weight of a 10% strength dibutyl-tin dilaurate solution in xylene are placed in a clean dry container and thoroughly mixed. 80.500 parts by weight of the copolymer containing hydroxyl groups and prepared in accordance with the invention (55% solids content) (component A) and 8.000 parts by weight of xylene isomer mixture are then added and the mixture is stirred. A clear paint having a run-out time of 77 seconds (flow cup having flow nozzle of 4 mm diameter at 20° C.) is obtained.

2. Clear Paint Using the Copolymer from Comparative Test 1

1,000 parts by weight of n-butyl acetate, 1,000 parts by weight of a 10% strength silicon oil solution in xylene, 5,000 parts by weight of SOLVESSO 100 ®, 2,607 parts by weight of xylene-isomer mixture, 0.750 parts by weight of light stabiliser of the BENZTRIAZOLE type, 0.7500 parts by weight of light stabiliser of the H A L S type, 0.320 parts by weight of N,N'-diethylethanolamine and 0.073 parts by weight of a 10% strength dibutyl-tin dilaurate solution in xylene are placed in a clean dry container and thoroughly mixed. 88.500 parts by weight of the copolymer from comparative test 1 are then added and the mixture is stirred. A clear paint having a run-out time of 75 seconds (flow cup having flow nozzle of 4 mm diameter at 20° C.) is obtained.

3. Clear Paint Using the Copolymer from Comparative Test 2

1,000 parts by weight of n-butyl acetate, 1,000 parts by weight of a 10% strength silicon oil solution in xylene, 5,000 parts by weight of SOLVESSO 100 ®, 2,607 parts by weight of xylene-isomer mixture, 0.750 parts by weight of light stabiliser of the BENZTRIAZOLE type, 0.7500 parts by weight of light stabiliser of the H A L S type, 0.320 parts by weight of N,N'-diethylethanolamine and 0.073 parts by weight of a 10% strength dibutyl-tin dilaurate solution in xylene are placed in a clean dry container and thoroughly mixed. 88.500 parts by weight of the copolymer from comparative test 2 are then added and the mixture is stirred. A clear paint having a run-out time of 320 seconds (flow cup having flow nozzle of 4 mm diameter at 20° C.) is obtained.

4. Clear Paint Using the Copolymer from Comparative Test 3

1,000 parts by weight of n-butyl acetate, 1,000 parts by weight of a 10% strength silicon oil solution in xylene, 5,000 parts by weight of SOLVESSO 100 ®, 2,607 parts by weight of xylene-isomer mixture, 0.750 parts by weight of light stabiliser of the BENZTRIAZOLE type, 0.7500 parts by weight of light stabiliser of the H A L S type, 0.320 parts by weight of N,N'-diethylethanolamine and 0.073 parts by weight of a 10% strength dibutyl-tin dilaurate solution in xylene are placed in a clean dry container and thoroughly mixed. 88.500 parts by weight of the copolymer from comparative test 3 are then added and the mixture is stirred. A clear paint having a run-out time of 33 seconds (flow cup having flow nozzle of 4 mm diameter at 20° C.) is obtained.

5. Clear Paint Using the Copolymer from Comparative Test 4

1,000 parts by weight of n-butyl acetate, 1,000 parts by weight of a 10% strength silicon oil solution in xylene, 5,000 parts by weight of SOLVESSO 100 ®, 2,607 parts by weight of xylene-isomer mixture, 0.750 parts by weight of light stabiliser of the BENZTRIAZOLE type, 0.7500 parts by weight of light stabiliser of the H A L S type, 0.320 parts by weight of N,N'-diethylethanolamine and 0.073 parts by weight of a 10% strength dibutyl-tin dilaurate solution in xylene are placed in a clean dry container and thoroughly mixed. 88.500 parts by weight of the copolymer from comparative test 4 are then added and the mixture is stirred. A clear paint having a run-out time of 17 seconds (flow cup having flow nozzle of 4 mm diameter at 20° C.) is obtained.

As the clear paints using the copolymers from comparative tests 3 and 4 in each case have too low a viscosity (run-out time: 33 and 17 seconds respectively) and thus cannot be applied to paints and are not to be used within the scope of the comparative tests, all solvents (n-butyl acetate, SOLVESSO 100, xylene) were omitted from the particular recipes 4. and 5. in order to increase the particular viscosities. The values thus obtained for the particular run-out time were 53 and 20 seconds respectively.

Preparation of the Curing Agent Solution

The following curing agent was prepared as the second component (component B) of the coating agent:

|  | Parts by weight: |
| --- | --- |
| Polyisocyanate based on hexamethylene diisocyanate | |
| DESMODUR N/75 MX ® | 44.00 |
| Butylglycol acetate | 2.00 |
| Xylene-isomer mixture | 9.00 |
| n-Butyl acetate | 15.80 |
| SOLVESSO 100 ® | 29.20 |
|  | 100.00 |

APPLICATION OF THE COATING AGENTS OBTAINED

The coating agents or clear paints containing binder A prepared above or binder prepared in accordance with the comparative tests 1 to 4 were mixed with the above curing agent (component B) of the coating agent in a weight-mixture ratio of 2:1 in each case shortly before processing.

The cold-hardening paints obtained were applied using the wet-on-wet process to a base paint layer by spray application of a dry film layer thickness of 50 to 60 μm, and after a flash-off phase of 10 minutes they were then cured for 30 minutes at 60° C. The results of the paint tests are shown in the following table. In this table, the results of paint tests on the coating agents have been carried out using binders from comparative tests 3 and 4 with the particular clear paints which had been prepared to increase the viscosities without the additional solvents.

TABLE PAINT TESTS

|  | Paint comparative tests using binder from comparative tests | | | | |
|---|---|---|---|---|---|
|  | 1 | 2 | 3 | 4 | Component A |
| Run-out time [s] (Mixture according to recipe) | 75 | 320 | 33 | 17 | 77 |
| Run-out time [s] (without additional solvents) |  |  | 53 | 20 |  |
| Air drying: |  |  |  |  |  |
| Adhesive (16 h) | + | + | − | − − | + |
| Body/Gloss | + | + | − − | − | (+) |
| Flow | + | (+) | − − | − | + |
| Oven drying: |  |  |  |  |  |
| 20 minutes | (+) | + | − | − − | (+) |
| 30 minutes | + | + | − | − − | + |
| Hardness | − | − | − − | − − − | + |
| Body/Gloss | + | + | − | + | + |
| Flow | + | + | − | + | + |
| Cover sample | − | + | − | − | + |
| Tendency to run (bead, bulge) | + | + | − | − − | + |

Key:
+: very good
(+): satisfactory
−: bad
− −: very bad
− − −: extremely bad

The results of the paint tests clearly show that the coating prepared using the binder of the invention is superior to the coatings prepared using the binders from comparative tests 1 to 4. The coating agents of the invention prove to be superior to the coatings prepared in accordance with the state of the art using the binders from comparative tests 1 to 4, as regards the cover sample and in particular as regards the hardness of the coating. The use of binder component A of the invention permits preparation of both medium-solid and high-solid coating agents, whereas when using binders from comparative test 2, with which—as can be seen from the table—the best paint test results are achieved of comparative tests 1 to 4, no medium-solid coating agents can be prepared, and the range of application is thus limited.

We claim:

1. Binder, suitable for clear or pigmented coating agents, containing a copolymer containing hydroxyl groups and based on addition products of $\alpha,\beta$-unsaturated acids and glycidyl esters and also $\alpha,\beta$-unsaturated monomers with and without hydroxyl groups which can form mixed polymers, characterised in that the binder consists essentially of a copolymer containing hydroxyl groups and which can be obtained from
   a) 24.5 to 30.0 wt. % of styrene,
   b) 12.0 to 15.0 wt. % of tert.-butylacrylate,
   c) 4.0 to 7.0 wt. % of iso-butylmethacrylate,
   d) 6.0 to 9.0 wt. % of 2-ethylhexylmethacrylate,
   e) 14.0 to 17.0 wt. % of 2-hydroxypropylmethacrylate,
   f) 10.0 to 13.0 wt. % of butanediol-1,4-monoacrylate,
   g) 4.0 to 5.0 wt. % of acrylic acid,
   h) 13.0 to 15.5 wt. % of glycidyl ester of $\alpha$-alkylalkanemonocarboxylic acids and/or $\alpha,\alpha$-dialkylalkanemonocarboxylic acids,
   wherein the sum of components a) to h) is 100% in each case.

2. Process for the preparation of the copolymer containing hydroxyl groups which can be used as a binder according to claim 1, by heating $\alpha,\beta$-unsaturated acids, glycidyl esters and also $\alpha,\beta$-unsaturated monomers with and without hydroxyl groups which can form mixed polymers, in the presence of polymerisation initiators, optionally organic solvents and optionally chain transfer agents, characterised in that a mixture essentially consisting of
   a) 24.5 to 30.0 wt. % of styrene,
   b) 12.0 to 15.0 wt. % of tert.-butylacrylate,
   c) 4.0 to 7.0 wt. % of iso-butylmethacrylate,
   d) 6.0 to 9.0 wt. % of 2-ethylhexylmethacrylate,
   e) 14.0 to 17.0 wt. % of 2-hydroxypropylmethacrylate,
   f) 10.0 to 13.0 wt. % of butanediol-1,4-monoacrylate,
   g) 4.0 to 5.0 wt. % of acrylic acid,
   h) 13.0 to 15.5 wt. % of glycidyl ester of $\alpha$-alkylalkanemonocarboxylic acids and/or $\alpha,\alpha$-dialkylalkanemonocarboxylic acids,
   is reacted.

3. A coating composition comprising from 60–80 wt. % of the binder of claim 1 and 20–40 wt. % of a divalent or polyvalent polyisocyanate.

* * * * *